July 19, 1955  C. M. TURSKY  2,713,377
METHOD AND APPARATUS FOR PRODUCING FILTER COILS
Filed Feb. 20, 1953
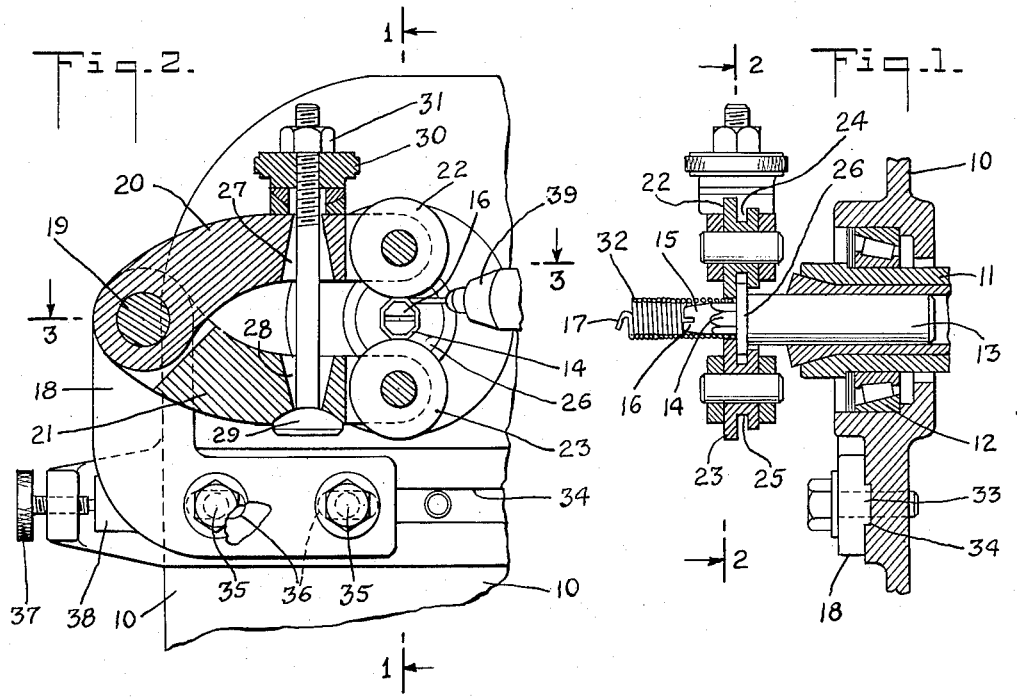
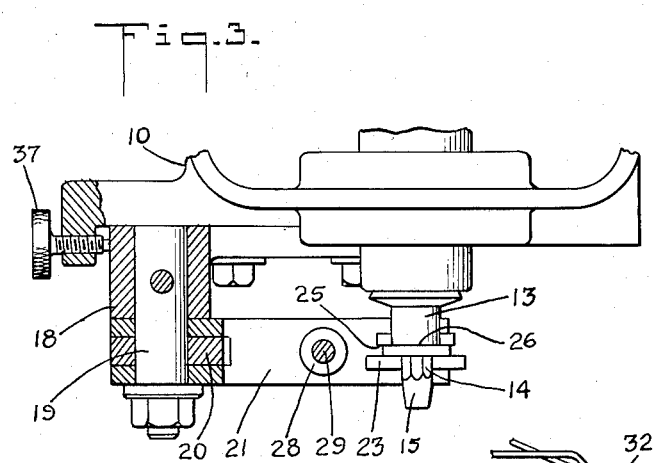
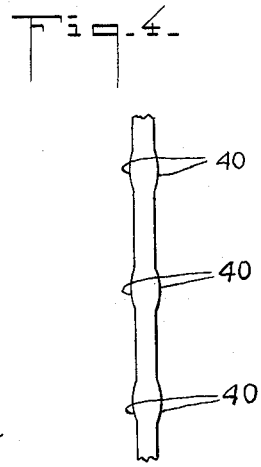
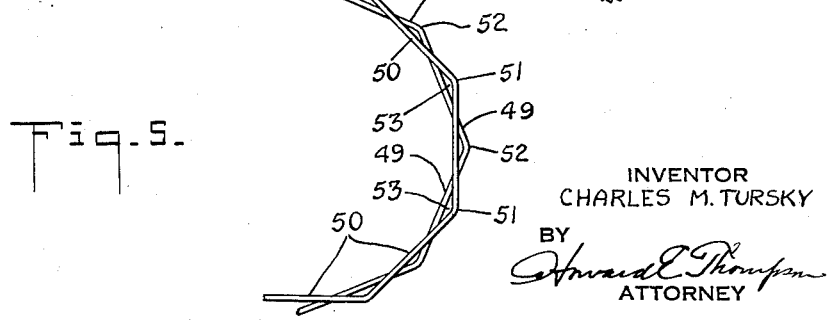
INVENTOR
CHARLES M. TURSKY
BY
ATTORNEY United States Patent Office 2,713,377
Patented July 19, 1955

2,713,377

METHOD AND APPARATUS FOR PRODUCING FILTER COILS

Charles M. Tursky, Plainfield, N. J.

Application February 20, 1953, Serial No. 337,949

4 Claims. (Cl. 153—64)

This invention deals with the production of filter coils, wherein a metallic strand is wound upon a multiple sided mandrel under controlled pressure in forming a tubular filter coil. More particularly, the invention deals with an apparatus for producing coils of the kind under consideration, wherein control is provided for governing the spacing between the separate windings of the filter coil, thus controlling the degree of filtration produced in the use thereof.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through part of an apparatus for winding the wire coil on a mandrel in forming filter coils, the section being on the line 1—1 of Fig. 2.

Fig. 2 is a section on the line 2—2 of Fig. 1.

Fig. 3 is a section on the line 3—3 of Fig. 2 showing part of the construction in elevation.

Fig. 4 is an enlarged view of a portion of a coil, diagrammatically showing the contour thereof.

Fig. 5 is a diagrammatic plan view showing another arrangement of coils one with respect to the other.

In illustrating one method of carrying my invention into effect, I have shown, in part, in the accompanying drawing a machine or apparatus for winding filter coils, wherein the resulting coils have a relative arrangement and spacing one with respect to the other in controlling the degree of filtration made possible by the use thereof.

In the drawing, 10 represents a portion of a machine, in which a tubular shaft 11 is rotatably mounted in suitable bearings, one of which is shown at 12. Fixed in the end of the shaft is a mandrel 13, having a movable surface section 14, which is octagon in cross-sectional form, as noted in Fig. 1. Outwardly of the section 14 is a tapered end 15 with a cross-slot 16 therein, the latter being adapted to receive the end of a wire and such an end is indicated at 17 in Fig. 1 of the drawing. Pivotally supported on an adjustable bracket 18, as seen at 19, are a pair of arms 20, 21, the outer ends of which support bearing rollers 22 and 23, respectively, the rollers being grooved, as seen at 24 and 25 to fit over a flange 26 on the mandrel inwardly of the surface area 14.

The arms 20, 21 have alined apertures 27 and 28, which are flared inwardly toward each other and in these apertures is arranged a bolt 29 with an adjustment nut 30 and lock nut 31 at one end, the latter controlling pressure engagement of the rollers 22 and 23 with the wire strand in forming the resulting filter coil 32.

The bracket 18 has a projecting bar portion 33, note Fig. 1, which fits in a longitudinal groove 34 in the frame 10 and the bracket is adjustably clamped in position by screws 35 which operate in elongated apertures 36 in the bracket in adjusting the arms 20, 21 with respect to the mandrel 13. The degree of this adjustment can be gauged by a screw 37 engaging a projection 38 on the bracket 18, as clearly seen in Figs. 2 and 3 of the drawing.

As diagrammatically seen in Fig. 2 of the drawing, a suitable wire strand guide 39 is employed to guide the strand onto the mandrel at a point adjacent the flange 26. The wire will be automatically pulled through the guide in rotation of the mandrel which is driven in the operation of the shaft 11 by any suitable driving means actuated at a predetermined rate of speed. The particular drive is not shown, as it forms no part of the present conception.

In starting the operation of winding a filter coil 32, an end of the wire strand is placed in the transverse slot 16 and the mandrel is turned a few turns, while directing the wire toward the flange 26, after which, the machine is put into operation, it being understood that the pressure of the rollers 22 and 23 have been adjusted to provide a predetermined pressure on the wire strand as it is being wound on the flat surfaced area 14 of the mandrel. The surfaces of the working end portion 14 are flat and circumferentially aligned and directly intersect in angular corners. In the construction shown, this flat surfaced area is eight-sided, but in different uses of the invention, it may have a different number of sides and, of course, the mandrel will be of different diameters in producing filter coils of different diameters. It will also be apparent that the particular gauge of wire, as well as cross-sectional contour of the wire, may be varied. However, in the construction shown, round wire is employed.

With the use of the pressure rollers 22 and 23, the corners of the resulting coil formed about the intersecting corners of the flat surfaces in the section 14 will be placed under sufficient pressure to enlarge upon the width of the wire coil to form what might be termed bumps or enlarged areas 40, noted in Fig. 4 of the drawing.

It will be understood that, while the wire strand is wound tautly upon the mandrel and under the pressure of the rollers 22, 23, which would apparently normally dispose the bumps or enlargements 40 in the same longitudinal alinement on the resulting coil, what actually takes place is that, as the coil passes down over the tapered end 15, the coil tension is relieved, which results in establishing the spiral arrangement of the bumps or enlargements on the coil and, by increasing the pressure of the rollers on the workpiece as it is formed on the mandrel, a greater spring-back is experience in the coil, thus resulting in the production of a more abrupt spiral and, in some instances, bringing the bumped or enlarged portions of adjacent windings at positions mid-way between the flats of such adjacent windings, as diagrammatically illustrated in Fig. 5 of the drawing and, while in this figure we are dealing with a coil similar to the coil 32, it will be identified in Fig. 5 as coil 32a, wherein the flats of one winding are illustrated at 49, the flat of an adjacent winding at 50, with the corner bumps or enlargements 51 of adjacent flats 50 mid-way between the bumps or enlargements 52 of the flat 49. This results in forming relatively large openings 53 in the triangular sections defined between, for example, the flat 49 and the enlargements or bumps 51, thus providing a larger filtrating area than would be provided between closely adjacent surfaces of the flats when arranged substantially one upon the other.

It will also be understood that, by decreasing the tension on the pressure rollers 22 and 23, less spiral movement would be provided between adjacent windings and, in fact, to such an extent that the enlarged or bumped areas might be arranged substantially one upon the other, which would produce another degree of filtration greater as to area than with the adjacent windings in the close position referred to above.

Coils of the kind under consideration can be produced to provide the finest degree of filtration in fluids of various kinds and classes, in fact, to such a degree as to filter or separate fluids, for example, in separating water from gasoline. In actual use in a filtering apparatus, a number of the filter coils are arranged in a filter casing or apparatus, such for example, as disclosed in my prior application, Serial Number 299,057; filed July 15, 1952 and filtration is accomplished by passage of the fluid to be filtered through the coils from the exterior to the interior of the coils.

In different uses, coils may be produced from fine gauge wires to heavier gauge wires in small and large diameter filter coils. However, a medium standard for average filtrations will be in utilizing coils substantially 3/8" in outside diameter, utilizing a .032 diameter stainless steel wire, wherein the filter coils can be made of lengths up to 6'.

By virtue of the controls provided, I employ a method of quickly and economically producing filter coils which would all have a precise specification standard, so as to produce in the use of a multiplicity of the coils in a filtering apparatus the desired degree of filtration precalculated by the specification coils utilized therein.

In utilizing round wire in the formation of the coils, it will be apparent that substantially line contacts or filter passages are formed between the adjacent windings. This provides natural entrance throats and discharge throats for the material being filtered and, in reverse flow of fluid, the filter coils may periodically be cleared in displacement of any sediment or foreign products or particles that may collect on the incoming side of the filter passages. In many instances, the actual pressure of the incoming fluid to be filtered operates to displace foreign or rejected products from the coils for collection at the base of a filtering apparatus in the form of a sediment, which can be periodically drained, thus minimizing the periods of time, at which cleaning of the filter apparatus by a reverse flow of fluid is necessary. In some instances, it may be more desirable to utilize wire of different cross-sectional forms such, for example, as flat wire, when it would be desirable to provide greater surface areas at the filter passages between the adjacent windings of the coils. Still further, it will be under- that, while referring to the coils as being filter coils, they might further be properly classified as separation coils, in which event, preadjustment can be provided between adjacent windings to separate one product from another, particularly with regard to size or viscosity or other characteristics of the respective products.

Turning back for the moment to the setting action of the filter coil after winding of the wire upon the surface section 14, it is well to point out that, as the coil is viewed at one end, keeping in mind that it has been formed around the eight-sided mandrel, actually sets to a contour that is substantially nine and a half flats in circumference and this is true of the adjacent windings. Thus the resulting coil gives the impression of being a round tubular coil modified solely by the spiral representation of the enlargements or bumps on the coil.

The filter coil, when in its filter state, will, at all times, maintain the relationship of the flats and bumps thereon, but this coil can be placed in the hand and the ends rotated so that all of the flats would be brought into a common alinement.

It will be apparent that the apparatus disclosed can be utilized in the formation of coils of any size, contour or shape, the contour or shape being controlled by the mandrel, around which the wire is formed and, here, it will be apparent that wire strands of the selected cross-sectional contour and of the material required can be used and, in the formation around the mandrel by the pressure rolls, the distortion or formation of the coil on what might be termed the bumped or formed areas sets up differential characteristics in the metal and thus contributes to the resulting coil increased tension or spring characteristics. In other words, a substantial spring can be formed from unhardened wire strands, such as stainless steel, steel, brass and the like and still give to the resulting coil body strong spring properties. In producing coil bodies, such as conventional coil springs used as such and shaping them over the angular surfaced mandrels that may be hexagons, octagons or the like, a spring is provided which presents in the bore of the spring, as well as on the surface thereof, a multiplicity of point contacts on a shaft or in a bore in which the spring may be arranged, thus materially minimizing frictional engagement which might take place in engaging either of the surfaces in question. This factor, together with the added tension properties or characteristics which are attributed to the strand by the circumferentially spaced formed section or areas thereof produce stronger springs, as well as springs having added tensional properties, thus facilitating a saving by minimizing the length of coil spring employed in different uses thereof.

It will also be apparent that by controlling the shape and contour of the mandrel, wire forms of varied shapes and contours can be produced, in all of which instances, the controlled pressure rollers will govern the shaping of the wire strand on the mandrel and the degree of pressure applied to the re-formed areas by adjustment of the rollers.

Having fully described my invention, what I claim as new and desire to secure by Letters Patent is:

1. A coil winding machine of the character described, comprising a frame, a mandrel rotatably mounted in the frame, the mandrel having a forming end portion, a bracket adjustably supported in the frame, a pair of arms having a common pivotal mounting on said bracket, free end portions of the arms supporting a pair of opposed grooved pressure rollers, manually actuated means operatively engaging the arms to control the pressure of said rollers on a work strip fed between the rollers and the working surface of said mandrel, the mandrel having a flange adjacent said working surface operating in the grooves of said rollers, and said flange guiding a strand onto the working surface of said mandrel.

2. A coil winding machine of the character described, comprising a frame, a mandrel rotatably mounted in the frame, the mandrel having a forming end portion, a bracket adjustably supported in the frame, a pair of arms having a common pivotal mounting on said bracket, free end portions of the arms supporting a pair of opposed grooved pressure rollers, manually actuated means operatively engaging the arms to control the pressure of said rollers on a work strip fed between the rollers and the working surface of said mandrel, the mandrel having a flange adjacent said working surface operating in the grooves of said rollers, said flange guiding a strand onto the working surface of said mandrel, means gauging adjustment of said bracket, the free end portion of said mandrel being fashioned to displace the coiled product after delivery from the working surface of the mandrel, and that part of the mandrel having said working surface being octagonal in cross-sectional form.

3. The herein described method of producing filter coils which comprises winding a wire strand upon a multiple surface work area of a rotatable mandrel, applying pressure to the strand in the operation of winding the same on the mandrel to produce enlarged sections on the strand at corner portions of the mandrel intersecting adjacent surface work areas thereof, automatically displacing the formed coil from the mandrel in the process of winding and forming the coil on said mandrel to produce in the finished coil a predetermined arrangement of the enlarged areas of the strand one with respect to the other on adjacent windings by controlling the applied pressure to the strand on the mandrel in the operation of forming said coil.

4. The herein described method of producing filter coils, which comprises tensionally winding a wire strand upon a multiple surface work area, said work area comprising a series of circumferential flats having intersecting corners, of a rotatable mandrel, applying sufficient pressure to the wire strand on said work areas in the operation of winding the strand to form enlargements in the coils at said corners of said flats, and controlling the tension of coil winding to govern the degree of final setting of the wound coil in governing the spiral arrangement of the enlargements one with respect to the other on the finished filter coil to thereby control the filter characteristics of the coil.

References Cited in the file of this patent

UNITED STATES PATENTS

| Number | Name | Date |
|---|---|---|
| 270,861 | Trimble | Jan. 16, 1883 |
| 296,269 | Beaman | Apr. 1, 1884 |
| 426,386 | Kelly | Apr. 22, 1890 |
| 534,410 | Stubbe | Feb. 19, 1895 |
| 892,660 | Getty | July 7, 1908 |
| 1,191,514 | Jameton | July 18, 1916 |
| 1,668,016 | Hauschild | May 1, 1928 |
| 2,248,440 | Schmid | July 8, 1941 |
| 2,308,865 | Davis | Jan. 19, 1943 |
| 2,431,928 | Garreau | Dec. 2, 1947 |
| 2,455,549 | Benjamin | Dec. 7, 1948 |
| 2,458,118 | Tursky | Jan. 4, 1949 |
| 2,584,154 | Oliver | Feb. 5, 1952 |

FOREIGN PATENTS

| Number | Country | Date |
|---|---|---|
| 5,623 | Netherlands | Mar. 15, 1921 |
| 636,693 | France | Jan. 14, 1928 |
| 189,732 | Switzerland | Aug. 16, 1937 |
| 514,247 | Great Britain | Nov. 2, 1939 |